April 14, 1931.  N. W. DORMAN ET AL  1,801,037

ADJUSTABLE DEVICE FOR POWER PRESSES AND THE LIKE

Filed Aug. 23, 1929

Inventors
Neal W. Dorman
Meredith R. Hatch

By Owen & Owen
Attorneys

Patented Apr. 14, 1931

1,801,037

UNITED STATES PATENT OFFICE

NEAL W. DORMAN AND MEREDITH R. HATCH, OF TOLEDO, OHIO, ASSIGNORS TO THE TOLEDO MACHINE & TOOL COMPANY, OF TOLEDO, OHIO, A CORPORATION OF OHIO

ADJUSTABLE DEVICE FOR POWER PRESSES AND THE LIKE

Application filed August 23, 1929. Serial No. 388,023.

This invention relates to an adjusting device for power presses and the like, with special reference to the adjustment of the slide with relation to its actuating means, such adjustment sometimes having a range of four feet or more.

In the slide adjusting means disclosed in our earlier application Serial No. 329,453 filed December 31, 1928, the adjustment is effected by means of a plurality of screws mounted for simultaneous rotation in one connecting member and each having a threaded connection with the other connecting member. The object of the present invention is to provide means for mounting such screws which will automatically adapt itself to all conditions which may arise in using the same and will make it impossible for the screws to bind. To this end, each screw is individually mounted so that it has a pivotal and floating support, whereby its head is evenly seated and will turn easily, even though its shank may be deflected by pressure or by inaccurate machining.

Figure 1:
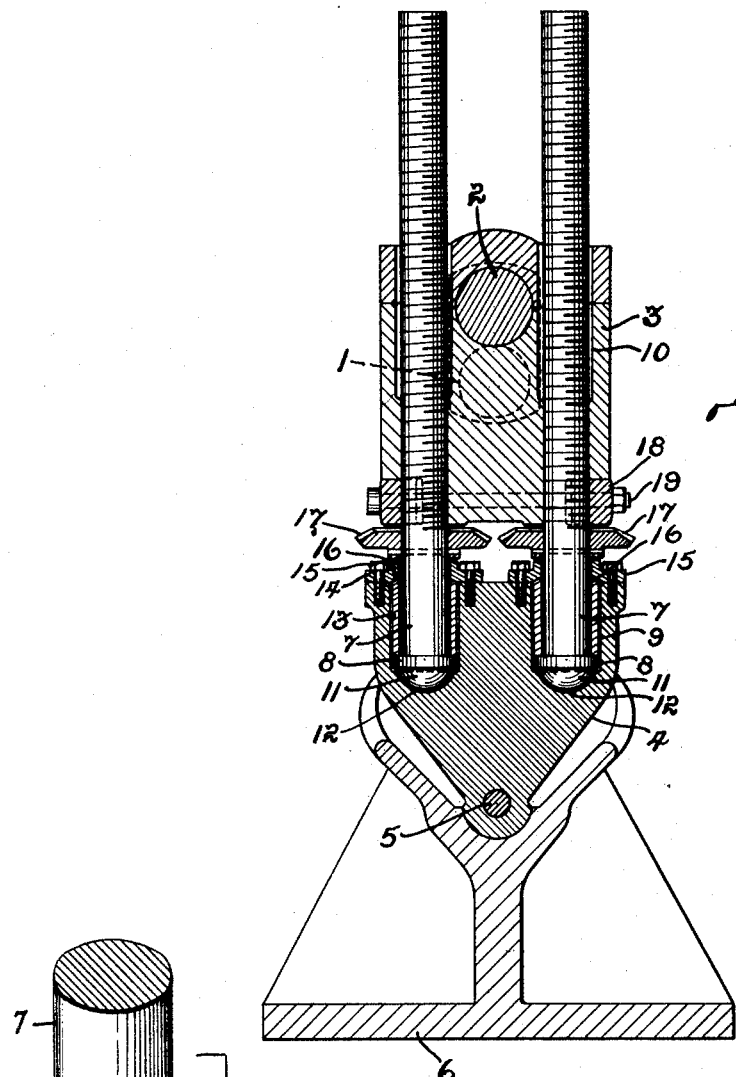
Figure 2:
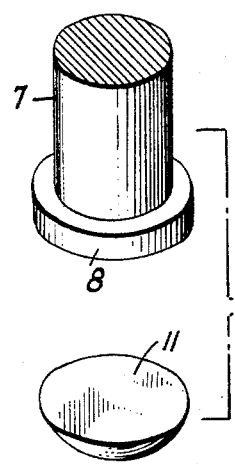

The construction of the invention and the advantages thereof will be more fully described in connection with the accompanying drawing, in which Fig. 1 represents a vertical sectional view taken transversely of the slide and in the plane of the screws and Fig. 2 is a perspective view of one of the screw heads and the spherical segment on which it seats.

In power presses of the type to which our invention relates, the slide is actuated by means of a crank shaft, as indicated at 1. This crank shaft is usually of the double crank type, one of the crank pins being shown at 2. The crank pin 2 is received in a bearing carried by a connecting member 3 and a second connecting member 4 is mounted for rectilinear adjustment toward or away from the member 3. The member 4 has a pivotal connection 5 with the slide 6.

The means for adjusting the distance between the two connecting members 3 and 4 comprises a pair of screws 7. In a double crank press there are two pairs of such screws, one pair at each end of the slide.

Each screw 7 has a head 8 which is rotatably received in a socket 9 formed in one of the connecting members as 4. The shank of the screw has a long threaded portion which engages the other connecting member 3, a portion of the shank being relieved, as shown at 10. The head 8 rests on a seat 11 which is in the form of a spherical segment, the bottom of the socket being recessed, as at 12, to receive the spherical surface of the segment. A retaining sleeve 13 within the socket 9 receives the shank of the screw 7 adjacent its head and is held within the socket by a collar 14 secured to the member 4 by machine screws 15 or the like. The outer end of the sleeve 13 where it engages the collar 14 is formed with a curved surface 16 which is concentric with the spherical surface of the segment 11.

Each screw 7 and sleeve 13 has a free running fit in the socket 9 and collar 14, thereby providing a floating and pivotal mounting which permits the screw to automatically adjust itself to a limited extent in case the shank is deflected by variations in pressure or through some other agency. The spherical surface of the segment 11 and the concentric surface 16 provides a ball and socket connection and the head 8 always has a full seating engagement with the flat surface of the segment.

For adjusting the position of the slide, suitable gear members 17 are secured to the respective screws and are adapted to be driven simultaneously. When the slide is properly adjusted, the screws are locked securely by suitable means such as clamping members 18 which may be drawn into clamping position by bolts 19.

While we have shown and described in detail one specific adaptation of the invention, it will be understood that the same may be modified to a considerable extent without departing from the scope of the invention as defined in the claims.

What we claim is:

1. In a device of the character described, a crank shaft, a slide, a connecting member journaled on the pin of the crank shaft, a second connecting member pivoted to the slide, screws having threaded connections with one connecting member and having heads rotatably mounted in the other connecting member, said last mentioned connecting member having sockets for receiving the heads of the screws, a seat for each screw head in the form of a spherical segment, the bottom of the socket being shaped to correspond to the spherical surface of the segment, and means for rotating all of said screws simultaneously to adjust the slide up or down.

2. In a device of the character described, two connecting members, screws having threaded connections with one of said members, the other of said members having sockets in which the screws are rotatable, an individual seat for the head of each screw in the form of a spherical segment having a ball and socket mounting in the bottom of the socket, and a retaining sleeve receiving the shank of the screw, said screw and sleeve each having a running fit in the socket, whereby the screw mounting is automatically adjustable to compensate for deflection of the shank.

3. The combination with a connecting member having a socket, of a screw with a head disposed in said socket, a seat for the screw head in the form of a spherical segment with its spherical surface fitting the bottom of said socket, a sleeve receiving the screw shank, and means secured to the connecting member and engaging the outer end of the sleeve to retain it in the socket, the meeting surfaces of the sleeve and retaining means being curved and concentric with the spherical surface of said segment, said screw and sleeve each having a running fit in their mounting, whereby they are automatically adjustable to allow for deflection of the screw shank.

4. In a device of the character described, two connecting members, flat headed screws having threaded connections with one of said members, the other of said members having sockets in which the head portions of the screws are rotatable, and an individual seat for each screw head, said seat being in the form of a spherical segment, the bottom of the socket having a bearing surface fitting the spherical surface of the segment, the flat head of the screw having a floating engagement with the flat surface of the segment.

5. In a device of the character described, two connecting members, flat headed screws having threaded connections with one of said members, the other of said members having sockets with spherical segments mounted therein and constituting individual seats for the heads of the respective screws, so that each screw will automatically adjust itself to compensate for any deflection which may occur in the screw shank.

In testimony whereof we have hereunto signed our names to this specification.

NEAL W. DORMAN.
MEREDITH R. HATCH.